(12) United States Patent
Paul

(10) Patent No.: US 7,406,504 B2
(45) Date of Patent: Jul. 29, 2008

(54) INTELLIGENT EMAIL DETECTION AND AUTO REPLY EMAIL TECHNIQUE TO EMAILS DESTINED TO NO REPLY EMAIL ADDRESSES

(75) Inventor: Gary B. Paul, San Antonio, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 1092 days.

(21) Appl. No.: 10/666,526

(22) Filed: Sep. 18, 2003

(65) Prior Publication Data

US 2005/0066005 A1  Mar. 24, 2005

(51) Int. Cl.
*G06F 15/16* (2006.01)
*G06F 17/00* (2006.01)

(52) U.S. Cl. .................. 709/206; 715/243
(58) Field of Classification Search ......... 709/204–207, 709/217–219; 715/243–253
See application file for complete search history.

(56) References Cited

U.S. PATENT DOCUMENTS

| | | | |
|---|---|---|---|
| 5,764,899 A | | 6/1998 | Eggleston et al. |
| 5,930,471 A | * | 7/1999 | Milewski et al. ............ 709/204 |
| 6,449,635 B1 | | 9/2002 | Tilden, Jr. et al. |
| 6,591,291 B1 | | 7/2003 | Gabber et al. |
| 6,691,153 B1 | * | 2/2004 | Hanson et al. ............... 709/204 |
| 6,804,670 B2 | * | 10/2004 | Kreulen et al. ............... 707/7 |
| 6,816,885 B1 | * | 11/2004 | Raghunandan ............... 709/206 |
| 6,865,268 B1 | * | 3/2005 | Matthews et al. ...... 379/265.09 |
| 7,185,108 B1 | * | 2/2007 | Okachi ....................... 709/207 |
| 2002/0026490 A1 | * | 2/2002 | Okamura ..................... 709/206 |
| 2002/0087646 A1 | * | 7/2002 | Hickey et al. ............... 709/206 |
| 2002/0133554 A1 | * | 9/2002 | Checkoway et al. ......... 709/206 |
| 2002/0156797 A1 | * | 10/2002 | Lee et al. ..................... 707/200 |
| 2003/0025943 A1 | * | 2/2003 | Carey ......................... 358/402 |
| 2003/0050908 A1 | * | 3/2003 | Kreulen et al. ............... 707/1 |
| 2003/0055668 A1 | * | 3/2003 | Saran et al. ................. 705/1 |
| 2003/0167234 A1 | * | 9/2003 | Bodmer et al. ............. 705/51 |

(Continued)

FOREIGN PATENT DOCUMENTS

GB 2386288 A * 9/2003

(Continued)

OTHER PUBLICATIONS

U.S. Appl. No. 2002/0026435 A1; Wyss et al.

(Continued)

*Primary Examiner*—Joseph E Avellino
(74) *Attorney, Agent, or Firm*—Toler Law Group, Intellectual Properties

(57) ABSTRACT

An intelligent email detection and auto reply email tool is disclosed. A method includes receiving an incoming email, determining whether the incoming email requires a response; and after determining that the incoming email requires a response, generating an auto reply email to the incoming email, wherein the incoming email is processed to determine characteristics of the auto reply email. Email sent to customers can have a no-reply origination address and control identifiers that then are recognized on incoming replies. The control identifiers can include such information as application information that identifies an application that generated the email (billing, marketing, order confirmation), region information, and an auto reply email count. The auto reply email can be associated with a web-based customer feedback tool including, for example, a dynamic web page that directly intelligently interlinks the customer to a web based email feedback system.

40 Claims, 7 Drawing Sheets

U.S. PATENT DOCUMENTS

| | | | |
|---|---|---|---|
| 2003/0172133 A1* | 9/2003 | Smith et al. | 709/219 |
| 2003/0172185 A1* | 9/2003 | Dezonno | 709/246 |
| 2003/0177189 A1* | 9/2003 | Tomono | 709/206 |
| 2003/0200334 A1* | 10/2003 | Grynberg | 709/206 |

OTHER PUBLICATIONS

U.S. Appl. No. 2002/0035607 A1; Checkoway et al.

U.S. Appl. No. 2003/0135554 A1; Bellotti et al.

* cited by examiner

| FIG. 6A | FIG. 6B |

INTELLIGENT EMAIL DETECTION AND AUTO REPLY EMAIL TECHNIQUE TO EMAILS DESTINED TO NO REPLY EMAIL ADDRESSES

BACKGROUND

1. Field of the Disclosure

The present disclosure relates to electronic communications and, more particularly, to the processing of incoming email.

2. Description of the Related Art

Electronic communication between businesses and their customers is becoming increasingly popular. Businesses often provide a website via the Internet that includes links to electronic applications and forms for communicating with customers. Additionally, businesses can send order confirmations, billing statements, account status, and marketing communications electronically via email to their customers for minimal cost.

Businesses often do not wish to receive replies to the emails sent to customers and thus insert a "no-reply" address as the origination address and prefer that customers utilize the website tools for communications. Most email receiving systems provide reply buttons that allow the easy generation of a reply message addressed to the origination address of the sent email. Customers often do reply to the sent message, even if requested otherwise. Additionally, some email receiving systems provide automatic out-of-office, mailbox full, or invalid address replies to the origination address of the sent email. Businesses face the dilemma of ignoring the reply emails and thus missing important customer communication or spending hours manually sorting through response emails to filter, sort and take action on the emails.

Accordingly, there is a need for an improved system and method of processing email and to address the above issues.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF PARTICULAR EMBODIMENT(S)

An intelligent email detection and auto reply email tool is disclosed. Email sent to customers can be formatted in such a way to provide intelligent tracking and processing by a layered system of processes that receive and detect the types of email replies received. An email sent to a customer can have a no-reply origination address and control identifiers that then are recognized on incoming replies. The control identifiers can include such information as application information that identifies an application that generated the email sent to the customer (billing, marketing, order confirmation), region information, and an auto reply email count.

Incoming email replies to the no-reply address are filtered by a layer of dynamic filters that search the addresses, subject line, and body of each email to detect common patterns, such as invalid address responses, out-of-office replies, and unsubscribe requests. An auto reply email is generated for incoming emails that require a response and is sent to the origination address of the incoming email.

The auto reply email can be associated with a web-based customer feedback tool including, for example, a dynamic web page that directly intelligently interlinks the customer to a web-based customer feedback system. The auto reply email can include a web form that has customer information pre-populated including the customer's original comments. This allows the customer to simply fill in some missing information and hit a submit button which then sends the email to the web-based customer feedback tool on the business's web site. The email is then directed to the correct channel for routing and handling. The intelligent email detection and auto reply email tool can also provide the flexibility to efficiently handle replies to outgoing email corporate-wide.

With this method, manual interpretation and intervention of incoming email is reduced, while bridging the gap between traditional email interactions and web-based feedback channels. The intelligent email detection and auto reply email tool can provide the flexibility to efficiently handle replies to outgoing email corporate-wide.

Figure 1:
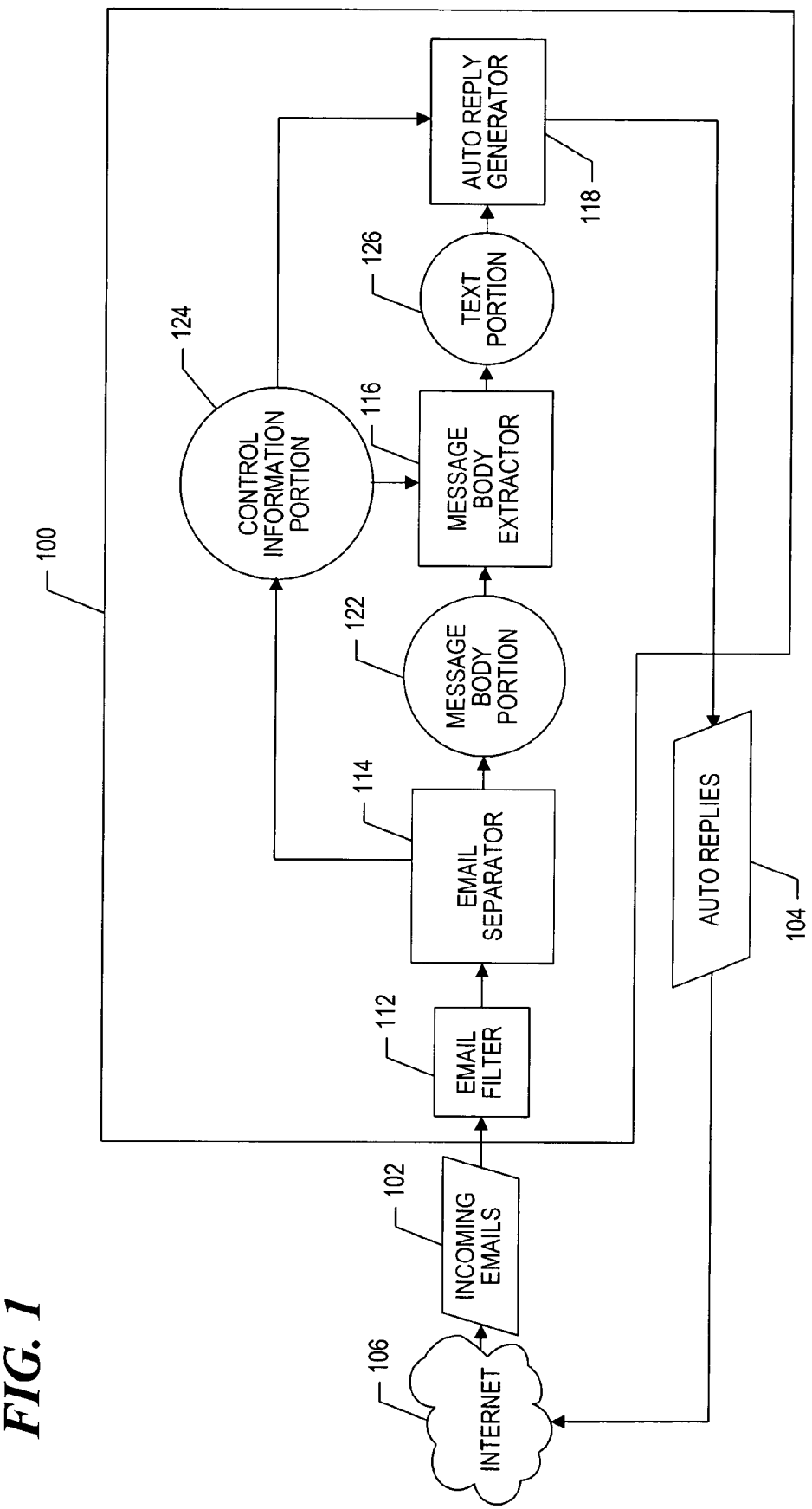
FIG. 1 illustrates a flow diagram of an intelligent email detection and auto reply email tool according to an embodiment of the present disclosure.

FIG. 1 illustrates a flow diagram of an intelligent email detection and auto reply email tool 100 according to an embodiment of the present disclosure. Tool 100 receives incoming emails 102 and sends auto reply emails 104 via Internet 106. Tool 100 includes an email filter 112, an email separator 114, a message body extractor 116 and an auto reply email generator 118. Filter 112 receives incoming emails 102. Incoming emails 102 are addressed to a specific destination address, for example, a no-reply address. Filter 112 determines the incoming emails 102 that require further action and forwards the selected emails to email separator 114. Separator 114 separates each email into multiple parts, including a control information portion 124 and a message body portion 122. Message body extractor utilizes message body portion 122 and control information portion 124 to extract a text portion 126 from the message body portion 122. Utilizing control information portion 124 and text portion 126, auto reply email generator 118 generates an auto reply email message.

The no-reply address includes control information that improves the generation of successful auto reply email messages. The no-reply address is constructed when an original email is sent to a customer. The no-reply address can have the format: applid.region.custtype(.arlcount)(.emailid)@noreply.company.com. The application identifier (applid) defines the application that sent the original message. For example, applications can include billing, order confirmation and other such tools. The region identifier (region) defines the customer's region or location such as northwest, California, or Europe. The customer type (custtype) defines the customer's product type such as residential or business. An optional auto reply email loop (ARL) count (arlcount) defines the number of times an auto reply email has been sent. An optional email identifier (emailid) can be included identifying a sender of the original email, which may be a unique number. The control information can be used for, among other things, defining a template for the auto reply email. If no control information is present or otherwise unrecognized, a generic auto reply email can be sent.

Figure 2:
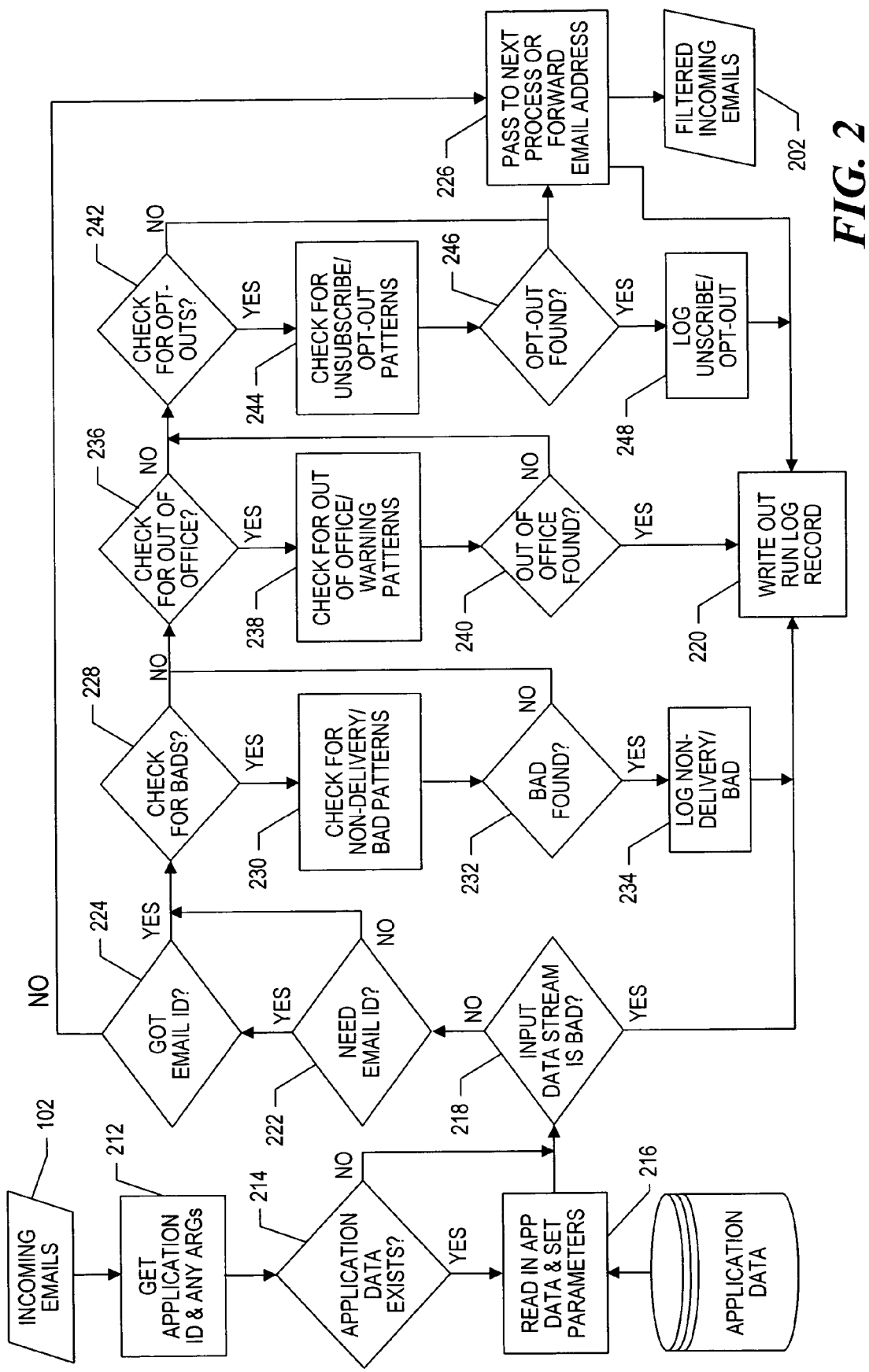
FIG. 2 is a flow diagram illustrating an operation of an email filter according to an embodiment of the present disclosure.

FIG. 2 is a flow diagram illustrating an operation of email filter 112 according to an embodiment of the present disclosure. Incoming emails 102 are examined to determine emails that require further action, resulting in filtered incoming emails 202. Email filter 112 identifies the incoming email to determine if it is associated with a particular application. If so, email filter 112 sets parameters to check for specific patterns, for example, out-of-office replies, invalid address responses, and unsubscribe notifications. Emails not requiring an auto reply email are filtered and not sent to the next process.

First, an application identifier and any associated arguments are identified in an incoming email, step 212. A determination is made whether application data for the identified application exists, step 214. If so, application data is obtained and any parameters set, step 216. A determination is made whether the data stream in the incoming email is invalid, step 218. If so, the process is ended and a log created, step 220. If the data stream is valid, parameters are checked to determine if an email identifier is needed, step 222. If so, a determination is made whether the incoming email has an email identifier, step 224. If not, the incoming email is passed on to the next process, step 226. If an email identifier is not needed or an email identifier is found, parameters are checked to determine if the incoming email is to be checked for non-delivery notification or other bad patterns, step 228. If the incoming email is to be checked, the incoming email is compared to, for example, common non-delivery pattern data, step 230. A determination is made whether the invalid pattern is found, step 232. If the invalid pattern is found, a non-delivery log is created, step 234 and the process is ended and a log created, step 220. If the invalid pattern is not found or is not checked for, parameters are checked to determine if the incoming email is to be checked for out-of-office or warning patterns, step 236.

If the incoming email is to be checked, the incoming email is compared to, for example, common out-of-office or warning pattern data, step 238. A determination is made whether the out-of-office or warning pattern is found, step 240. If the out-of-office or warning pattern is found, the process is ended and a log created, step 220. If the out-of-office or warning pattern is not found or is not checked for, parameters are checked to determine if the incoming email is to be checked for opt-out or unsubscribe emails, step 242. If the incoming email is to be checked, the incoming email is compared to, for example, common opt-out or unsubscribe pattern data, step 244. A determination is made whether an opt-out email is found, step 246. If found, an opt-out log is created, step 248 and the process is ended and a log created, step 220. If an opt-out is not found or is not checked for, the incoming email is passed to the next process, step 226, as one of filtered emails 202.

Non-delivery logs and opt-out logs (not shown) can be used to eliminate those customer addresses from mailing lists.

Figure 3:
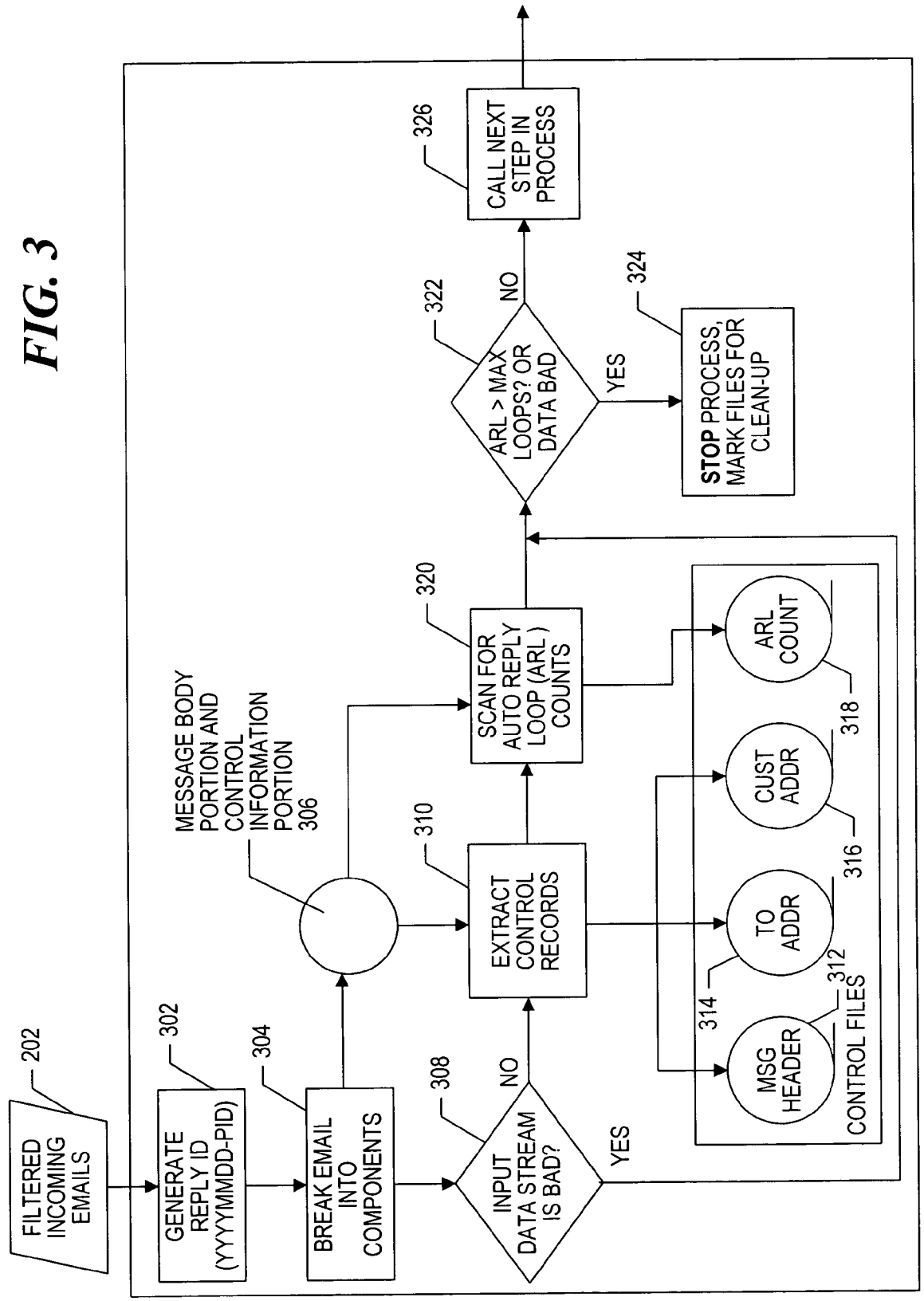
FIG. 3 is a flow diagram illustrating an operation of an email separator according to an embodiment of the present disclosure.

FIG. 3 is a flow diagram illustrating an operation of an email separator according to an embodiment of the present disclosure. Each filtered email is separated into multiple components, for example, control information portions and a message body portion.

Each of filtered incoming emails 202 are assigned a reply identification, step 302. For example, the reply identification can have the format YYYYMMDD-PID, including the year (YYYY), month (MM), day (DD) and a unique identifier (PID). The reply identifier tracks the multiple components throughout the auto reply email generation process to enable the successful generation of an auto reply email. Each of filtered incoming emails 202 are separated into multiple parts, step 304, including message body and control information portions 306. A determination is made if the input data stream is bad, step 308. If not, control records are extracted, step 310. Control records can include a message header 312, a destination address (to addr) 314, and an origination address (customer addr) 316. An auto reply email loop (ARL) count 318 is scanned for, step 320. ARL count 318 identifies the number of times the email has been through the process, for example, if a customer has repeatedly replied to the no-reply address and not accessed the web-based customer feedback tool as directed. A determination is made whether ARL count 318 is greater than a predetermined threshold value or the data stream is bad, step 322. For example, the predetermined threshold can be set at two or three. If ARL count 318 is greater than a predetermined threshold value, the process is ended and files are marked for clean up, step 324. If the ARL count 318 is not greater than the predetermined threshold value and the data stream is determined to be valid, the next process is called, step 326.

Figure 4:
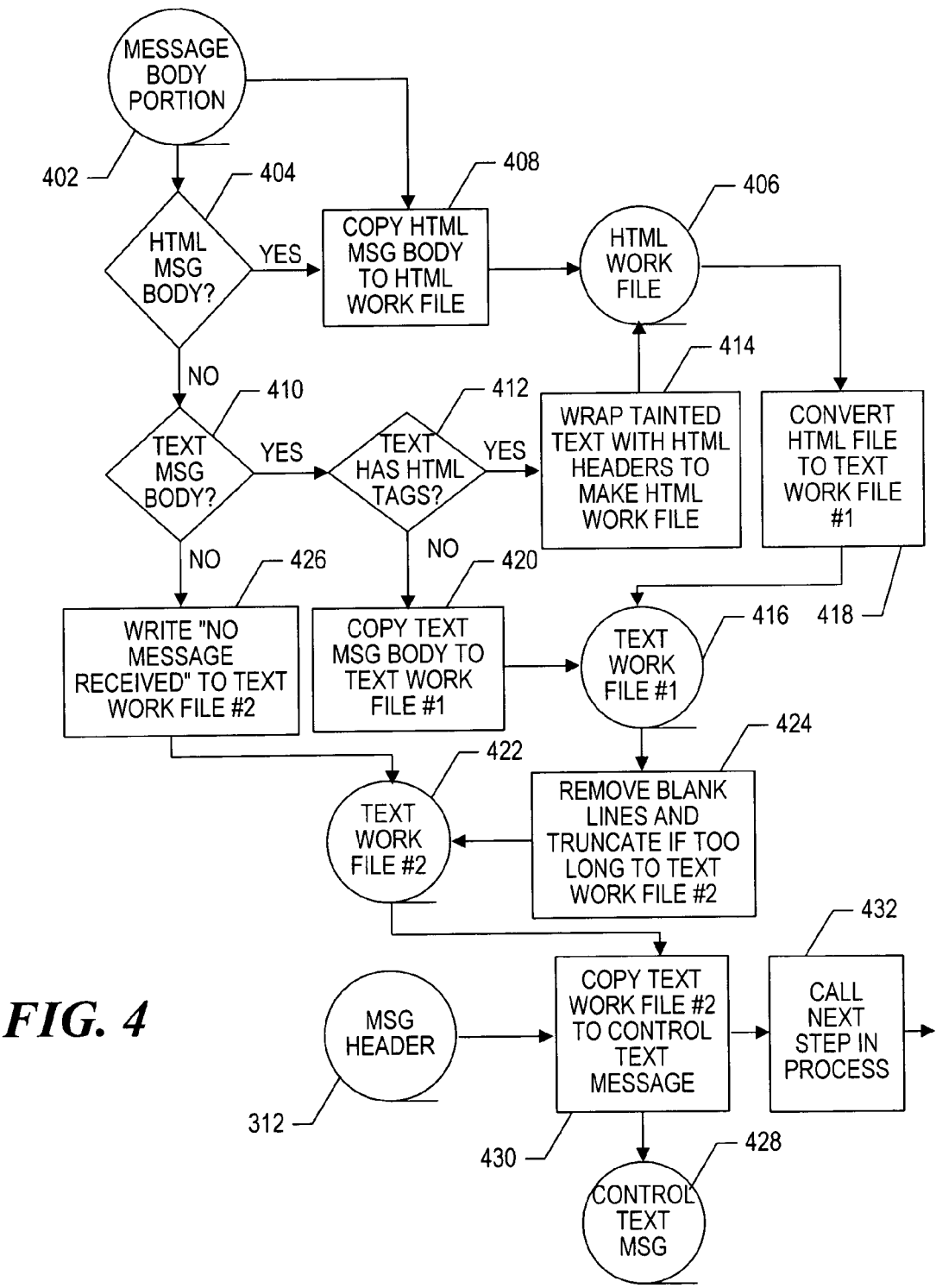
FIG. 4 is a flow diagram illustrating an operation of a message body extractor according to an embodiment of the present disclosure.

FIG. 4 is a flow diagram illustrating an operation of a message body extractor according to an embodiment of the present disclosure. Message body portion 402 is examined to determine if it contains an HTML message body, step 404. If so, the HTML message body is copied to an HTML work file 406, step 408. If the message body portion 402 does not contain an HTML message body, a determination is made whether it has a text message body, step 410. A determination is made whether the text message body contains HTML tags, step 412. If so, the tainted text message is wrapped with HTML headers and written to HTML work file 406, step 414. HTML work file 406 is converted to a first text work file 416, step 418. If the text message body does not have HTML tags, the text message body is copied to the first text work file 416, step 420. The first text work file 416 has any blank lines removed, is truncated if greater than a predetermined limit, and is written to a second text work file 422, step 424. The predetermined limit can be set according to a field in a template used for the auto reply email. If the message body portion 402 does not contain an HTML message body or a text message body, a "No message received" message is written to the second text work file 422, step 426. Message header 312 and the second text work file 422 are combined and copied to control text message 428, step 430. The next process is called, step 432.

Figure 5:
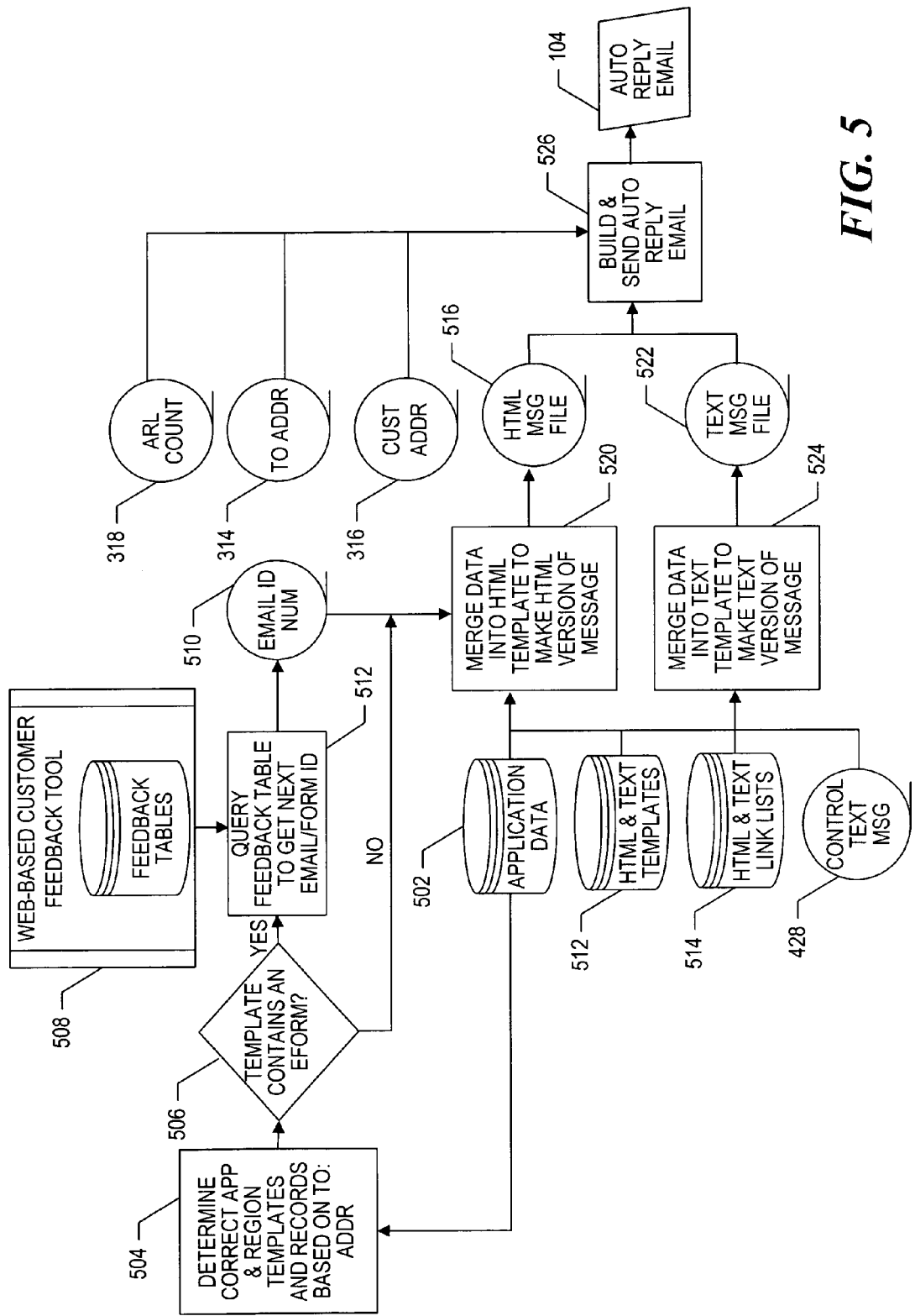
FIG. 5 is a flow diagram illustrating an operation of an auto reply email generator according to an embodiment of the present disclosure.

FIG. 5 is a flow diagram illustrating an operation of an auto reply email generator according to an embodiment of the present disclosure. A template is selected from an application database 502 utilizing information contained in destination address 314 of the incoming email, step 504. For example, destination address 314 can include an application identifier and a region identifier. These identifiers are used to select a template from multiple templates customized for different applications and regions. A determination is made whether the selected template contains an electronic form, step 506. If so, a feedback table of a web-based customer feedback tool 508 is queried to get a next email form identifier 510, step 512.

Next email form identifier 510 is used to uniquely identify each customer feedback response. Typically customer responses are received via a customer accessing web-based customer feedback tool 508 via the Internet and next email form identifier 510 is assigned when the customer enables a submit response button on a web page. According to a particular embodiment of the present disclosure, the web page is included in the auto reply email message sent to a customer and includes next email form identifier 510. Next, data from application database 502, HTML and text templates database 512, HTML and text linked lists database 514 and control text message 428 are merged with next email form identifier 510 creating an HTML message file 516, step 520. Next, data from application database 502, HTML and text templates database 512, HTML and text linked lists database 514 and control text message 428 are merged creating a text message file 522, step 524. Auto reply email 104 is generated from HTML message file 516 and text message file 522 and sent, step 526.

Throughout all of the above processes, logs are written and kept tracking the auto reply email generation process. Logs can be useful for performance purposes, cleaning up bad address lists, and for overall improving customer relations.

Figures 6, 6A:
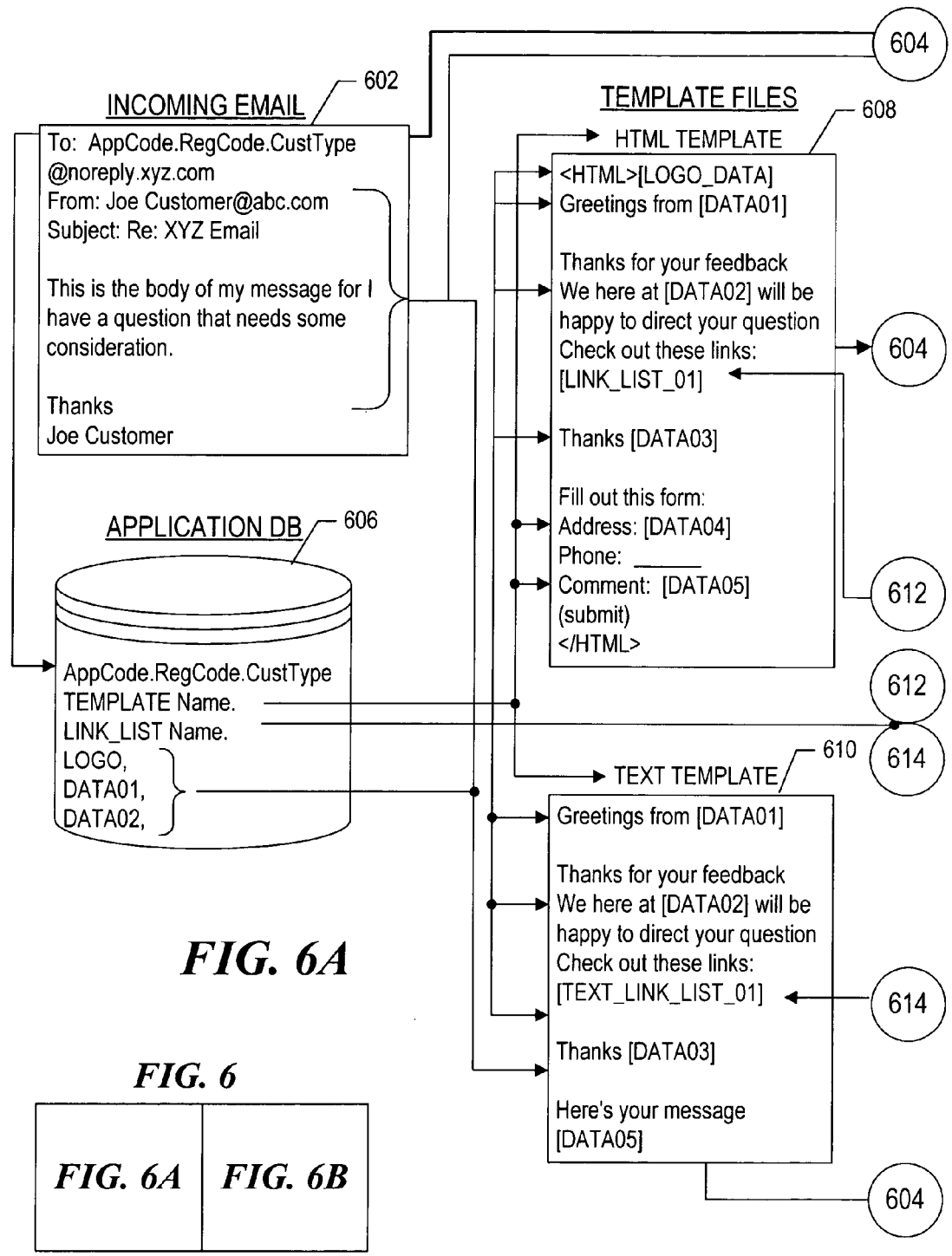
FIGS. 6A and 6B illustrate a data flow diagram of an intelligent email detection and auto reply email tool according to an embodiment of the present disclosure.
Figure 6B:
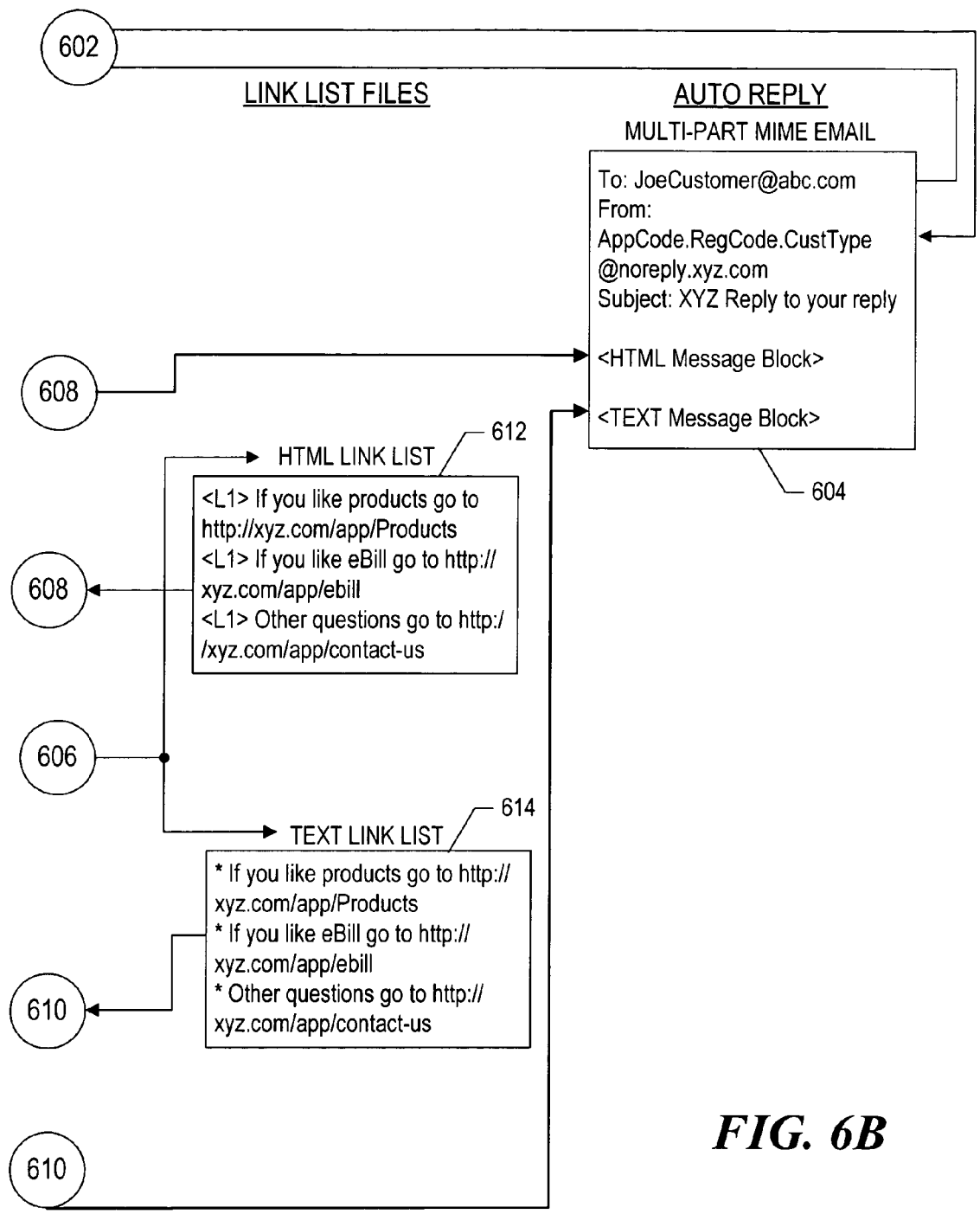

FIGS. 6A and 6B illustrate a data flow diagram of an intelligent email detection and auto reply email tool according to an embodiment of the present disclosure. Each incoming email 602 includes a destination address, for example, (AppCode.RegCode.CustType@noreply.xyz.com). The destination address is typically a no-reply address that was an origination address of an email sent to a customer. Incoming email 602 also includes an origination address, for example, (JoeCustomer@abc.com). Additionally, incoming email can include a subject line and a message body that can be in HTML format or text format. As illustrated, the origination address and the destination address of incoming email 602 substantially become the destination address and the origination address, respectively, of auto reply email 604. Note that an ARL count may have been incremented and other fields modified or added. Additionally, the destination address is used to select various processing characteristics in application database 606. For example, an HTML template 608 and a text template 610 are chosen. Additionally, HTML link list 612 and text link list 614 to be included in the templates can be identified. Other information, such as a logo and various data to be included in the templates can also be identified. The message body of incoming email 602, after processing, is included in HTML template 608 and text template 610. The populated HTML template 608 and the populated text template 610 are merged together to form auto reply email 604.

Templates are identified using application, region and customer type identifiers. Each template can have multiple associated files, for example, an HTML file with a web electronic form (eform), an HTML version without a web eform, and a text only version without a web eform. Link files are also identified and include for example, an HTML fragment file version using HTML tags and a text fragment file version with hyperlinks spelled out.

The processes described above are utilized for the generation of an auto reply email according to embodiments of the disclosure. It is appreciated that operations discussed herein can include steps executed by software modules. The functionality of steps referred to herein may correspond to the functionality of modules or portions of modules. The software modules can include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Operations may be combined or the functionality of the operations may be distributed in additional operations in accordance with the present disclosure.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing incoming emails, the method comprising:
   receiving an incoming email including a no-reply destination address;
   examining the no-reply destination address of the incoming email to determine whether the no-reply destination address indicates that the incoming email is associated with a particular application;
   selectively processing control information indicated by the no-reply destination address of the incoming email to determine characteristics of an auto reply email to the incoming email;
   generating the auto reply email based on the determined characteristics; and
   sending the generated auto reply email to a source address of the incoming email.

2. The method, as recited in claim 1, further comprising:
   separating the incoming email into a plurality of parts, the plurality of parts including a control information portion; and
   processing the control information of the control information portion to determine the characteristics of the auto reply email.

3. The method, as recited in claim 2, wherein the control information portion comprises a region identifier and an application identifier.

4. The method, as recited in claim 3, further comprising selecting a template for the auto reply email based on the region identifier and the application identifier.

5. The method, as recited in claim 4, wherein the template is a web page linked to a customer feedback tool.

6. The method, as recited in claim 4, wherein the template is a text message directing a customer to a customer feedback tool.

7. The method, as recited in claim 2, wherein the control information portion comprises an identifier of a sent email, wherein the incoming email is a reply to the sent email.

8. The method, as recited in claim 2, wherein the control information portion includes an auto reply email loop count.

9. The method, as recited in claim 8, further comprising comparing the auto reply email loop count to a predetermined threshold value, and selectively sending the auto reply email based on a result of the comparison.

10. The method, as recited in claim 8, wherein to determine the characteristics of the auto reply email comprises incrementing the auto reply email loop count.

11. The method, as recited in claim 2, wherein the control information portion comprises a message header, a destination address, an origination address, and an auto reply email loop count.

12. The method, as recited in claim 11, the no-reply destination address includes a sent email identifier and an application identifier.

13. The method, as recited in claim 12, wherein the application identifier identifies one of an electronic billing application, a confirm order status application, and a marketing application.

14. The method, as recited in claim 1, wherein generating the auto reply email comprises:
   separating the incoming email into a plurality of parts, the plurality of parts including a message body portion;
   processing the message body portion producing an extracted text portion;
   choosing an auto reply email template based on the control information; and
   forming the auto reply email by adding the extracted text portion to the auto reply email template.

15. The method, as recited in claim 14, wherein processing the message body portion comprises:
   converting the message body portion into the extracted text portion in response to determining that the message body portion includes an HTML portion.

16. The method, as recited in claim 15, wherein converting the message body portion comprises:
   converting the HTML portion into a text only portion;
   removing blank lines from the text only portion; and
   truncating the text only portion.

17. The method, as recited in claim 16, wherein the text only portion is truncated after determining that the text only portion size exceeds a predetermined limit that is determined according to a size of a web field.

18. The method, as recited in claim 14, wherein processing the message body portion comprises:
   converting the message body into the extracted text portion.

19. The method, as recited in claim 14, wherein processing the message body portion comprises removing an attachment to the message body portion.

20. The method, as recited in claim 14, wherein forming the auto reply email includes placing the extracted text portion into a web field of the auto reply email template.

21. The method, as recited in claim 14, wherein the auto reply email template is a web page linked to a customer feedback tool.

22. The method, as recited in claim 14, wherein the auto reply email template is a text message directing a customer to a customer feedback tool.

23. The method, as recited in claim 1, further comprising determining if the incoming email is one of an out-of-office reply, a notification of an incorrect address, an unsubscribe email, and a reply containing a customer inquiry that requires a response.

24. The method, as recited in claim 1, wherein the incoming email is received in response to a broadcast email sent to a plurality of customers, the broadcast email including a no-reply from address and one or more control identifiers.

25. The method, as recited in claim 1, wherein the incoming email is received in response to an email sent to a customer, the email sent to the customer including a no-reply from address and one or more control identifiers.

26. The method, as recited in claim 1, wherein the auto reply email includes a next email form identifier from a customer feedback tool.

27. The method, as recited in claim 1, further comprising:
   separating the incoming email into a plurality of parts, the plurality of parts including a control information portion and a message body portion;
   processing the control information of the control information portion to determine the characteristics of the auto reply email;
   processing the message body portion producing an extracted text portion;
   choosing an auto reply email template based on the control information; and
   forming the auto reply email by adding the extracted text portion to the auto reply email template.

28. The method, as recited in claim 1, wherein the auto reply email is associated with a customer feedback tool.

29. An apparatus comprising:
   an auto reply email tool stored in a memory and configured to:
   receive incoming emails includinci no-reply destination addresses;
   examine the no-reply destination addresses of the incoming emails to determine whether a no-reply destination address of an incoming email indicates that the incoming email is associated with a particular application;
   selectively process control information associated with the no-reply destination address of the incoming email to determine characteristics of an auto reply email to the incoming email;
   generate the auto reply email based on the determined characteristics; and
   send the generated auto reply email to a source address of the incoming email.

30. The apparatus, as recited in claim 29, wherein the auto reply email tool comprises:
   an email filter to examine the no-reply destination addresses of the incoming emails to determine whether a no-reply destination address of an incoming email indicates that the incoming email is associated with a particular application;
   a separator configured to split the incoming email into a plurality of parts, the plurality of parts including a control information portion and a message body portion;
   a message body extractor configured to process the message body portion producing an extracted text portion; and
   a generator configured to choose an auto reply email template based on the control information of the control information portion, to form the auto reply email by adding the extracted text portion to the auto reply email template, and to send the formed auto reply email to a source address of the incoming email.

31. The apparatus, as recited in claim 30, wherein the auto reply email template is a web page linked to a customer feedback tool.

32. The apparatus, as recited in claim 30, wherein the auto reply email template is a text message directing a customer to a customer feedback tool.

33. The apparatus, as recited in claim 30, wherein the control information of the control information portion comprises a region identifier and an application identifier.

34. The apparatus, as recited in claim 33, further comprising selecting the auto reply email template based on the region identifier and the application identifier.

35. A system comprising:
an auto reply email tool stored in a memory and configured to:
receive incoming emails including no-reply destination addresses;
examine no-reply destination addresses of the incoming emails to determine whether a no-reply destination address of an incoming email indicates that the incoming email is associated with a particular application;
selectively process control information indicated by the no-reply destination address of the incoming email to determine characteristics of an auto reply email to the incoming email;
generate the auto reply email to the incoming email, the auto reply email linking a sender of the incoming email to a customer feedback tool based on the determined characteristics; and
send the generated auto reply email to a source address of the incoming email.

36. The system, as recited in claim 35, wherein the auto reply email tool comprises:
a separator configured to split the incoming email into a plurality of parts, the plurality of parts including a control information portion and a message body portion;
a message body extractor configured to process the message body portion producing an extracted text portion; and
a message generator configured to choose an auto reply email template based on the control information of the control information portion and to form the auto reply email by adding the extracted text portion to the auto reply email template.

37. The system, as recited in claim 36, wherein the auto reply email template is a web page linked to a customer feedback tool.

38. The system, as recited in claim 36, wherein the auto reply email template is a text message directing a customer to a customer feedback tool.

39. The system, as recited in claim 36, wherein the control information of the control information portion comprises a region identifier and an application identifier.

40. The system, as recited in claim 39, further comprising selecting the auto reply email template based on the region identifier and the application identifier.

* * * * *